(12) United States Patent
Butler et al.

(10) Patent No.: US 12,314,402 B2
(45) Date of Patent: May 27, 2025

(54) SECURE USER INTERFACE SIDE-CHANNEL ATTACK PROTECTION

(71) Applicant: Trustonic Limited, Cambridge (GB)

(72) Inventors: Simon Butler, York (GB); Jesus Jose Gianzo Villaverde, Cambridge (GB); John Michael Dent, Cambridge (GB); Baptiste Gourdin, Issy-les-Moulineaux (FR)

(73) Assignee: Trustonic Limited, Cambridge (GB)

( * ) Notice: Subject to any disclaimer, the term of this patent is extended or adjusted under 35 U.S.C. 154(b) by 307 days.

(21) Appl. No.: 17/876,852

(22) Filed: Jul. 29, 2022

(65) Prior Publication Data
US 2023/0035830 A1 Feb. 2, 2023

(30) Foreign Application Priority Data
Jul. 30, 2021 (GB) .................................. 2111005

(51) Int. Cl.
*G06F 21/57* (2013.01)
*G06F 21/51* (2013.01)
*G06F 21/53* (2013.01)
(52) U.S. Cl.
CPC ............ *G06F 21/577* (2013.01); *G06F 21/51* (2013.01); *G06F 21/53* (2013.01); *G06F 2221/033* (2013.01)
(58) Field of Classification Search
CPC ........ G06F 21/577; G06F 21/51; G06F 21/53; G06F 2221/033

USPC ............................................. 726/23
See application file for complete search history.

(56) References Cited

U.S. PATENT DOCUMENTS

| 10,237,057 B2 * | 3/2019 | Cucinotta ................. H04L 9/14 |
| 10,289,839 B1 | 5/2019 | Bedekar et al. |
| 10,867,035 B1 | 12/2020 | Chauhan |
| 2016/0180331 A1 * | 6/2016 | Tuscano ............. G06Q 20/4012 705/72 |
| 2019/0213581 A1 * | 7/2019 | Zarakas ................. G07F 7/0833 |
| 2022/0210114 A1 * | 6/2022 | Buck ....................... H04L 63/10 |

OTHER PUBLICATIONS

Combined Search and Examination Report for GB2111005.1 dated Dec. 14, 2021, 7 pages.

* cited by examiner

*Primary Examiner* — Lan Dai T Truong
(74) *Attorney, Agent, or Firm* — NIXON & VANDERHYE P.C.

(57) ABSTRACT

A method for providing a secure user interface on a computing device comprising: receiving, from a user application, a request to utilise a secure user interface on the computing device; obtaining, by a first countermeasure module, first information associated with a security context of the computing device; generating, by the first countermeasure module, a first security assessment based on analysis of the first information; determining, by a security determination module, whether to permit the request to utilise the secure user interface based on the first security assessment; and responsive to a positive determination, enabling access by the user application to the secure user interface.

16 Claims, 8 Drawing Sheets

SECURE USER INTERFACE SIDE-CHANNEL ATTACK PROTECTION

This application claims priority to GB 2111005.1 filed Jul. 30, 2021, the entire contents of which are hereby incorporated by reference.

FIELD AND BACKGROUND

The present techniques relate to the field of providing a secure user interface on a computing device. More particularly, the described techniques relate to various ways in which secure user interfaces can be protected from side-channel attacks.

Computing devices often include a variety of different input and output devices, for example sensor devices, that may be used by a malicious actor in a side-channel attack to gain information relating to the computing device or the user of the computing device. In particular, when a computing device is displaying a secure user interface, for example a pin code entry page or password entry page, the computing device is particularly at risk of a side-channel attack.

Examples of side-channel attacks relating to secure user interfaces include using a microphone of the computing device to record a sound a user makes when typing in their pin/password, or using an orientation sensor or accelerometer of the computing device to detect subtle changes in the orientation of the computing device during pin/password entry. Using this collected data, a malicious actor may be able to discern information about the user's pin or password.

Indeed, it has been shown that smartphone sensors can be leveraged to infer user touch locations on a screen of the smartphone and consequently infer the information typed by the user. As mentioned above, in some examples, a microphone may be used to infer this information. In other examples, a combination of sensor inputs may be used, for example, accelerometer, gyroscope and magnetometer data may be used to infer this information.

In certain prior approaches, and in an attempt to provide side-channel attack protection, a secure user interface has been provided using a hardware-supported Trusted User Interface. However, as recognised by the inventors of the present invention, not all computing devices have the necessary hardware to support a hardware-supported Trusted User Interface. Additionally, and as also recognised by the inventors of the present invention, it is desirable to increase protection from side-channel attacks even when a hardware-supported Trusted User Interface is used to provide a secure user interface.

At least certain embodiments of the present disclosure address one or more of these problems as set out above.

SUMMARY

Particular aspects and embodiments are set out in the appended claims.

Viewed from one perspective, there is provided a method for providing a secure user interface on a computing device comprising: receiving, from a user application, a request to utilise a secure user interface on the computing device; obtaining, by a first countermeasure module, first information associated with a security context of the computing device; generating, by the first countermeasure module, a first security assessment based on analysis of the first information; determining, by a security determination module, whether to permit the request to utilise the secure user interface based on the first security assessment; and responsive to a positive determination, enabling access by the user application to the secure user interface.

In other words, the present approach can be considered for example as a method to provide a secure user interface only if a security context of the computing device indicates that it is safe to do so. In particular, the present approach ensures that a request from a user application to utilise a secure user interface of a computing device is permitted and access thereby enabled only once a first countermeasure module has obtained information associated with a security context of the computing device. Based on this information, a security assessment is generated and a security determination module determines, based on the security assessment, whether to permit the request. As such, access to a secure user interface is only permitted if the security determination module determines that it is safe for it to be permitted. Thereby, security and protection from potential side-channel attacks is increased.

Viewed from a further perspective, there is provided a computing device for providing a secure user interface comprising: processing circuitry to perform data processing; and data storage storing at least one computer program for controlling the processing circuitry to perform any of the above-described methods.

Viewed from a further perspective, there is provided a computer-readable medium for providing a secure user interface on a computing device comprising instructions which, when executed by a processor, cause the processor to carry out the any of the above-described methods. In some examples, the computer-readable medium is a non-transitory computer-readable medium.

Viewed from a further perspective, there is provided a computer program product for providing a secure user interface on a computing device comprising instructions, which, when the computer program is executed by a processor, cause the processor to carry out any of the above-described methods. In some examples, the computer program product is stored on a storage medium.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which.

Figure 1:
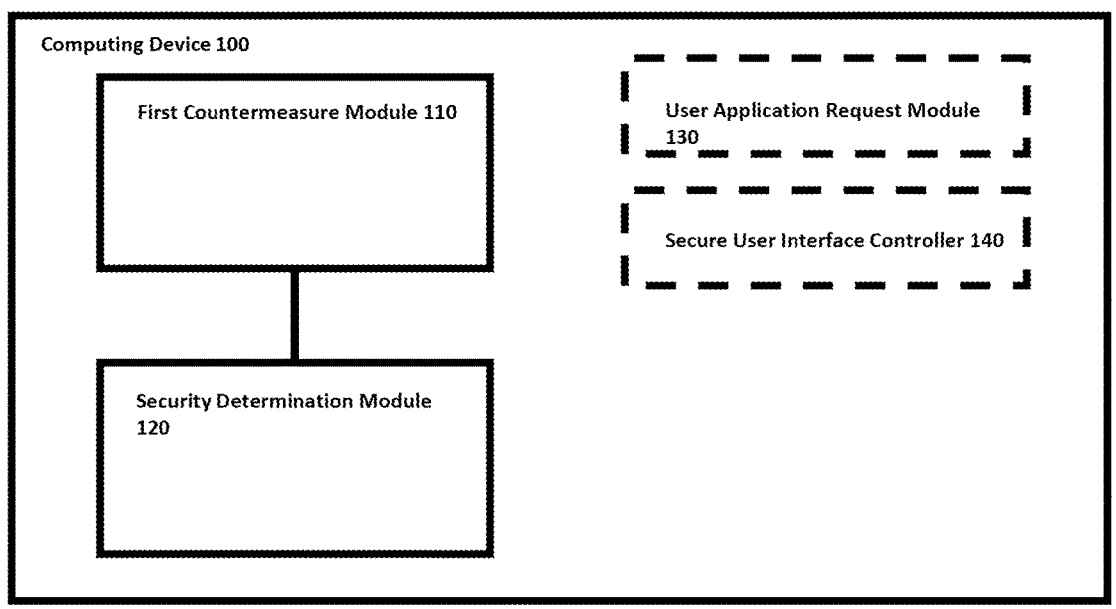
FIG. 1: Schematically illustrates a computing device configured to operate according to teachings of the present disclosure.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIG. 1 shows a schematic illustration of a computing device configured to operate according to teachings of the present disclosure. This figure depicts a computing device 100. In some examples, the computing device is a mobile phone, tablet, laptop or any other computing device capable of providing a secure user interface.

In the current example, the computing device 100 includes a first countermeasure module 110 and a security determination module 120. As also shown in FIG. 1, computing device 100 may include a user application request module 130 and a secure user interface controller 140. It will be appreciated that one or both of the user application request module 130 and secure user interface controller 140 may be implemented as separate modules, or combined physically or logically with other modules of the computing device 100, for example, the first countermeasure module 110 or the security determination module 120. Furthermore, the first countermeasure module 110 may be logically or physically combined with the security determination module 120. Although not shown, computing device 100 may be running an Android or iOS Operating System.

In the current example, the user application request module 130 acts to receive requests from a user application of the computing device 100 to utilise a secure interface on the computing device 100. In accordance with the present disclosure, a secure interface is an interface where a user of the computing device 100 is able to input a pin/password or other sensitive information to the computing device 100. In some examples, the user application request module 130 is a separate module, and in other examples it is not a separate module and instead its functionality is implemented in one or more of the first countermeasure module 110, security determination module 120, and secure user interface controller 140.

In the current example, the secure user interface controller 140 acts to control access by the user application to the secure user interface. In this way, the secure user interface controller 140 may enable access, not enable access, or revoke access by the user application to the secure user interface. In the current example, the secure user interface controller 140 is a separate module, and in other examples it is not a separate module and its functionality is instead implemented in one or more of the first countermeasure module 110, security determination module 120, and user application request module 130.

In the current example, the first countermeasure module 110 acts to obtain first information associated with a security context of the computing device 100. In some examples, the first information associated with a security context of the computing device 100 indicates whether a malicious actor is potentially attempting to perform a side-channel attack. In accordance with the present disclosure, it will be appreciated that obtain or obtaining means both passively obtaining and actively obtaining, or in other words, obtaining covers both receiving unprompted, as well sending out a request and receiving a reply in response to the request.

In the current example, the first countermeasure module 110 also acts to generate a first security assessment based on analysis of the first information. The first security assessment may indicate whether a malicious actor is attempting to perform a side-channel attack. In some examples, the first security assessment may be a processed version of the first information, or may be an assessment indicating a yes or no judgement. In such cases, it is computationally efficient to provide a succinct security assessment. In other examples, the first security assessment may include analysis of the first information or a confidence level based on a level of confidence of the security assessment's indication. In such cases, greater detail can be imparted that can lead to more granular security policy application.

In the current example, the security determination module 120 acts to determine whether to permit the request to utilise the secure user interface based on the first security assessment. In some examples, the security determination module 120 is a separate module from the first countermeasure module 110, and as such separate security policies may be implemented and responsibility may be distributed.

In the current example, responsive to a positive determination, access by the user application to the secure user interface is enabled. The access may be enabled by the secure user interface controller 140. In other words, if the security determination module 120 determines to permit the request, a positive determination has been made, and the secure user interface controller 140 may enable the requested access.

In the current example, the modules depicted in FIG. 1 are communicatively coupled to each other. In some examples, a hierarchical arrangement may be implemented to prevent communication between modules where communication is not required to increase security. While certain combinations of various elements depicted in FIG. 1 have been described above, the present inventors have contemplated that substantially any of the elements may be logically and/or physically combined.

Figure 2:
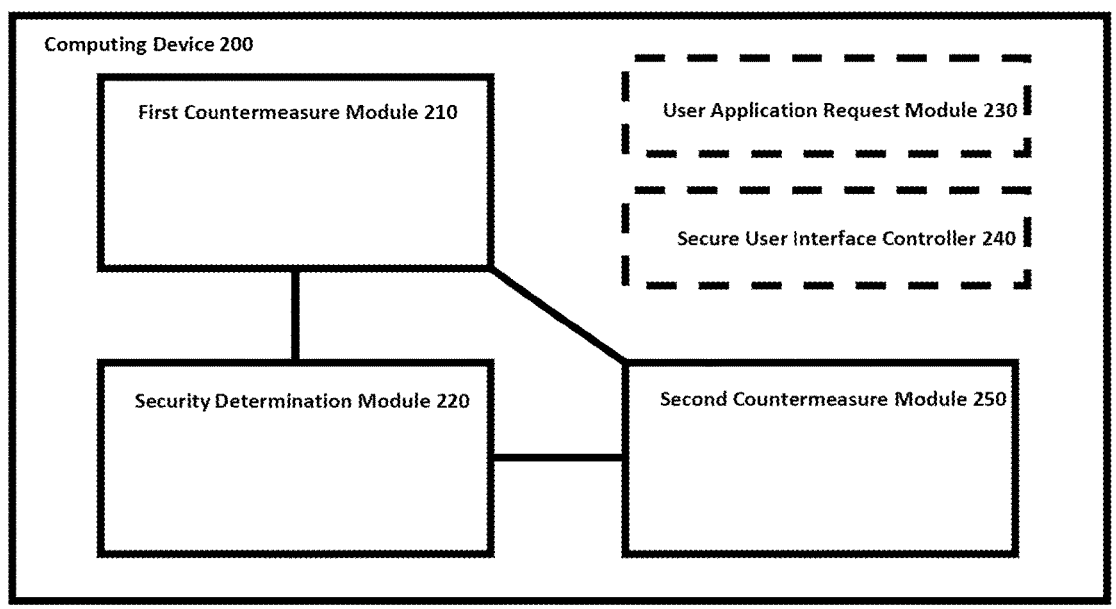
FIG. 2: Schematically illustrates a computing device configured to operate according to further teachings of the present disclosure.

FIG. 2 shows a schematic illustration of a computing device configured to operate according to further teachings of the present disclosure. Computing device 200 may be a similar computing device as that shown in FIG. 1. Furthermore, elements shown in FIGS. 1 and 2 that are the same have the same functionality as described above and that discussion will not be repeated here. In particular, first countermeasure module 110 from FIG. 1 and first countermeasure module 210 from FIG. 2 may have similar functionality, security determination module 120 from FIG. 1 and security determination module 220 from FIG. 2 may have similar functionality, user application request module 130 from FIG. 1 and user application request module 230 from FIG. 2 may have similar functionality, and secure user interface controller 140 from FIG. 1 and secure user interface controller 240 from FIG. 2 may have similar functionality.

As shown in FIG. 2, computing device 200 includes a second countermeasure module 250. In this example, the second countermeasure module 250 acts to generate a second security assessment based on verifying effective operation of the first countermeasure module 210. In this example, the security determination module 220 determines whether to permit the request to utilise the secure user interface based on both the first security assessment and the second security assessment.

In other words, in this example, the second countermeasure module 250 ensures that the first countermeasure module 210 is operating effectively, and the decision whether to permit the request to utilise the secure user interface is based on the first countermeasure module's first security assessment and whether the first countermeasure module is actually operating effectively. Effective operation may mean that the first countermeasure module 210 is able to operate in that it is able to obtain first information and generate a first security assessment, and/or it may mean that the first countermeasure module 210 has not been compromised or that its integrity has been verified. In doing so, in this example, operation of the first countermeasure module 210 is verified and the likelihood that a malicious actor may be able to circumvent the first countermeasure module and still perform a side-channel attack during user access to the secure user interface is reduced, thereby increasing security. Additionally, in an event where the first countermeasure module is not able to effectively operate, any request to utilise a secure user interface may not be permitted, thus preventing the possibility of providing a secure user interface when not able to monitor for side-channel attacks, thereby increasing security.

Figure 3:
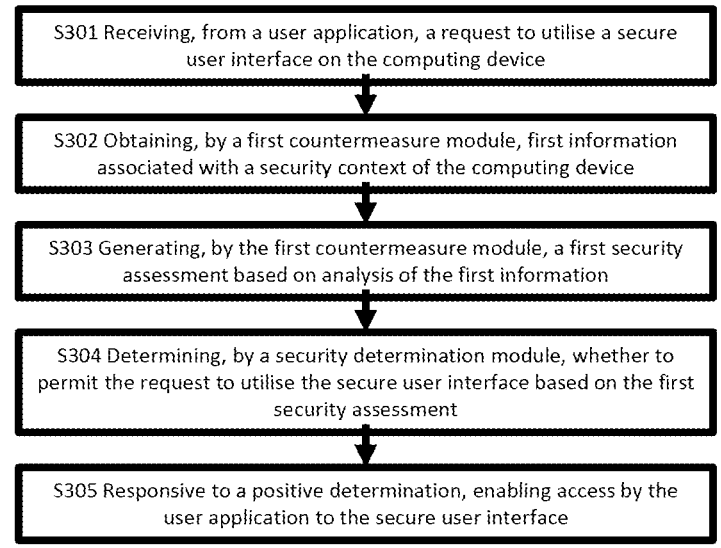
FIG. 3: Schematically illustrates a method for providing a secure user interface on a computing device according to teachings of the present disclosure.

FIG. 3 schematically illustrates a method 300 for providing a secure user interface on a computing device according to teachings of the present disclosure. It will be understood that method 300 can be implemented on the computing device 100 depicted in FIG. 1 or the computing device 200 depicted in FIG. 2. The method 300 includes the following steps.

At step S301, a request is received from a user application to utilise a secure user interface on the computing device.

At step S302, first information associated with a security context of the computing device is obtained by a first countermeasure module.

At step S303, a first security assessment is generated by the first countermeasure module based on analysis of the first information.

At step S304, it is determined, by a security determination module, whether to permit the request to utilise the secure user interface based on the first security assessment.

At step S305, responsive to a positive determination (from step S304), access by the user application to the secure user interface is enabled.

In other words, the present approach can be considered, for example, as a method of determining whether a security assessment based on information associated with a security context of the computing device indicates that a request from a user application to utilise a secure user interface may be granted or not granted. Thereby, if the first countermeasure module obtains information indicating that a malicious actor is attempting to perform a side-channel attack, a request to utilise a secure user interface is not permitted. As such, vulnerability of a secure user interface to a side-channel attack is reduced and security of the secure user interface is thereby increased. In other words, the present approach provides a secure user interface that is less vulnerable to side-channel attacks.

In the current example, at step S301, a request to utilise a secure user interface on the computing device 100 is received from a user application. This request may be received by the user application request module 130, or a different module of the computing device 100. The secure user interface may be an interface whereby a user of the computing device 100 is able to input a pin/password or other sensitive information to the computing device 100.

In the current example, at step S302, the first countermeasure module 110 obtains first information associated with a security context of the computing device 100. In some examples, the first information associated with a security context of the computing device 100 indicates whether a malicious actor is potentially attempting to perform a side-channel attack.

In some examples, the first information comprises information based on one or more of: a sensor input to the computing device 100, an output from the computing device 100, and a software process running on the computing device 100. In this example, the first countermeasure module 110 is able to detect information relating to sensor input, output or a software process running on the computing device 100, which may indicate that a malicious actor is attempting to carry out a side-channel attack. In some examples, when the first information is based on at least a sensor input, the first information comprises information as to whether the sensor is physically enabled, whether data is being sent and received from the sensor, whether another software application running on the computing device is accessing the sensor, and/or whether the sensor appears in a list of active sensors of the computing device. In some examples, when the first information is based on at least an output, the first information comprises information as to the content of the output and/or whether an output device is active. In some examples, the software process running on the computing device may be screen capture software.

In some examples, the first countermeasure module implements one or more rule-based algorithms to determine the first security assessment based on analysis of the first information. For example, the first countermeasure module may utilise a look-up table to determine whether the information relating to sensor input, output or a software process running on the computing device 100 is indicative of malicious activity and a potential side-channel attack. In some examples, the first countermeasure module utilises a black list of known malicious sensor inputs, outputs or software processes to determine whether the information is indicative of malicious activity. In some examples, the first countermeasure module utilises one or more of artificial intelligence, machine learning and neural network based techniques to determine whether the information is indicative of malicious activity. In some examples, the first countermeasure module utilises a decision tree.

In some examples, the first information comprises information based on a status of one or more of: a sensor of the computing device 100, a microphone of the computing device 100, a position sensor of the computing device 100, an orientation sensor of the computing device 100, an accelerometer of the computing device 100, a camera of the computing device 100, and a service recording a display of the computing device 100. In some examples, the sensor of the computing device 100 may be one or more of: an ambient temperature sensor, a magnetic field sensor, a gyroscope, a heart rate sensor, a light sensor, a proximity sensor, a pressure sensor, a relative humidity sensor, a step detector, a tilt detector, a LIDAR sensor, and a touchscreen sensor. In other words, the first countermeasure module 110 obtains information that relates to the sensors of the computing device or a screen recording service, the status of which may indicate the security context of the computing device 100. In particular, the first countermeasure module 110 may obtain first information that indicates that a sensor of the computing device 100, for example a microphone, is active, thereby indicating that the microphone is being used potentially by a malicious actor to record the sound of input from the user to the computing device 100. In some examples, from the recorded sound the position of a user's interaction with a screen may be determined from careful analysis of the recorded sound picked up by the microphone. This may, for example, be combined with orientation sensor and accelerometer data to further refine the determination of physical interactions of a user with the computing device. This may allow for a side channel attack in that a malicious process could determine a user's typed PIN number or password. In another example, the first countermeasure module 110 may obtain first information that indicates that a sensor of the computing device 100, for example a magnetic field sensor, is active, thereby indicating that the magnetic field sensor if being used potentially by a malicious actor to determine magnetic field characteristics surrounding the computing device and determining a possible location of the computing device, for example that the device is indoors. This may, for example, by combined with temperature data to further refine this determination. As a further example, an accelerometer of the computing device could be used as a microphone to intercept a user's voice input to a user interface.

In some examples, the first information may comprise information indicating that a request has been received for a permission or access to a permission that is considered sensitive. In some examples, the first countermeasure module may maintain a list of sensitive permissions that when requested, cause the first countermeasure module to generate a first security assessment indicating that a malicious actor is attempting to perform a side-channel attack.

According to the current example, at step S303, the first countermeasure module 110 generates a first security assessment based on analysis of the first information. For example, the first security assessment may be an assessment as to whether the first information associated with the security context of the computing device 100 indicates that a malicious actor is attempting to perform a side-channel attack. In some examples, the security assessment may indicate a yes or no decision, for example. In other examples, the security assessment may include a summary or analysis of the first information, and/or it may also include an indication of a confidence level associated with the indication of whether there is potentially malicious activity occurring or about to occur.

Still according to the current example, at step S304, the security determination module 120 determines whether to permit the request to utilise the secure user interface based on the first security assessment from the first countermeasure module 110. For example, as mentioned above, the first security assessment may include an indication as to whether or not potentially malicious activity is occurring on the computing device 100. When the security determination module 120 determines that the first security assessment indicates that there is no malicious activity occurring, the security determination makes a positive determination as to whether to permit the request to utilise the secure user interface.

Responsive to such a positive determination, access by the user application to the secure user interface is enabled, as shown in Step S305. In some examples, this access is enabled by the security determination module 120. In other examples, the computing device 100 further comprises a secure user interface controller 140 that may control access by the user application to the secure user interface and it may be the secure user interface controller 140 that enables access.

When the security determination module 120 determines that the first security assessment indicates that there is malicious activity occurring, the security determination makes a negative determination as to whether to permit the request to utilise the secure user interface. In such a case, responsive to a negative determination, access by the user application to the secure user interface is not enabled.

Figure 4:
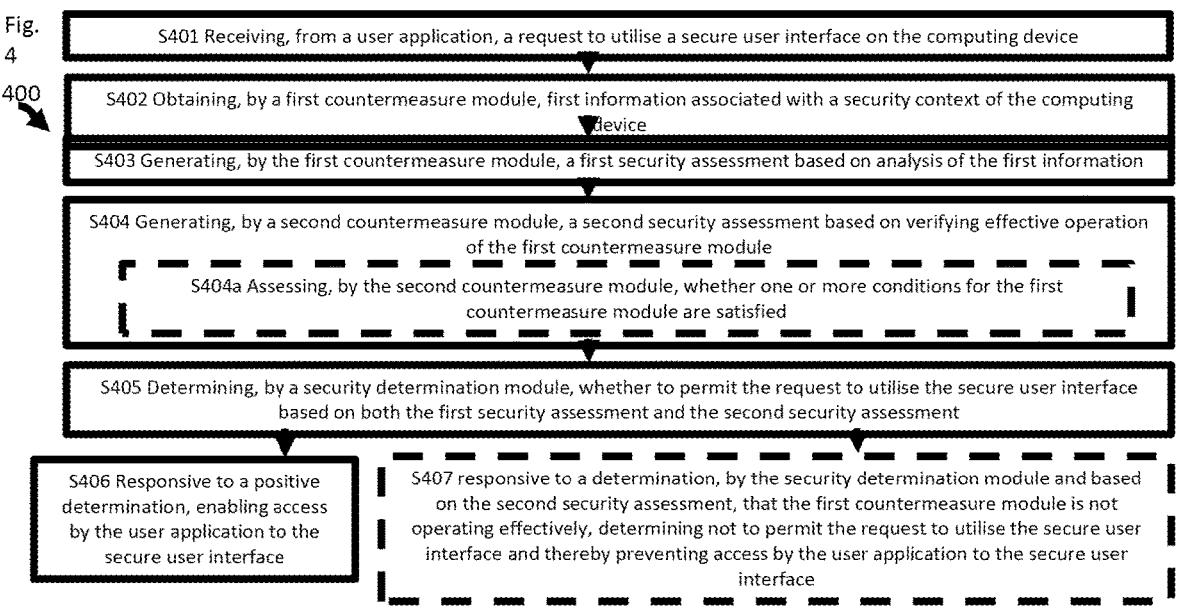
FIG. 4: Schematically illustrates a method for providing a secure user interface on a computing device according to further teachings of the present disclosure.

FIG. 4 schematically illustrates a method 400 for providing a secure user interface on a computing device according to teachings of the present disclosure. It will be understood that method 400 can be implemented on the computing device 200 depicted in FIG. 2. It will further be understood that method 400 can be performed in the same manner as method 300, and the previous discussion regarding similar features between method 300 and method 400 applies here. The method 400 includes the following steps.

At step S401, a request is received from a user application to utilise a secure user interface on the computing device.

At step S402, first information is obtained by a first countermeasure module associated with a security context of the computing device.

At step S403, a first security assessment is generated by the first countermeasure module based on analysis of the first information.

At step S404, a second security assessment is generated by a second countermeasure module based on verifying effective operation of the first countermeasure module.

At step S405, it is determined by a security determination module whether to permit the request to utilise the secure user interface based on both the first security assessment and the second security assessment.

At step S406, responsive to a positive determination, access by the user application to the secure user interface is enabled.

In other words, in this example, the second countermeasure module ensures that the first countermeasure module is operating effectively, and the decision whether to permit the request to utilise the secure user interface is based on the first countermeasure module's first security assessment and whether the first countermeasure module is actually operating effectively. Effective operation may mean that the first countermeasure module 210 is able to operate in that it is able to obtain first information and generate a first security assessment, and/or it may mean that the first countermeasure module 210 has not been compromised or that its integrity has been verified. In doing so, in this example, operation of the first countermeasure module 210 is verified and the likelihood that a malicious actor may be able to circumvent the first countermeasure module and still access the secure user interface is reduced, thereby increasing security. Additionally, in an event where the first countermeasure module is not able to effectively operate, any request to utilise a secure user interface is not permitted, thus preventing the possibility of providing a secure user interface when not able to effectively monitor for side-channel attacks, thereby increasing security.

In some examples, step S404 further comprises step S404a: assessing, by the second countermeasure module, whether one or more conditions for the first countermeasure module are satisfied. In such examples, the second countermeasure module may efficiently generate the second security assessment and allow for efficient assessment as to the operation of the first countermeasure module. In some examples, the one or more conditions relate to one or more of: a user granted access permission, and an API property. In this case, these conditions being satisfied allow for the first countermeasure module 210 to effectively monitor a list of active processes running on the computing device. In this case, the conditions are satisfied when a user has granted access permission, and when the API property exceeds a predetermined threshold and/or version. The API property may relate to an Android API level or an iOS API level.

In some examples, the one or more conditions may comprise information indicating that the source of the first security assessment has been authenticated, i.e. that the source of the first security assessment is the first countermeasure module. In some examples, the one or more conditions may comprise a condition indicating that the primary countermeasure module is active. In some examples, the one or more conditions may comprise a condition indicating that the primary countermeasure module has not been compromised. In some examples, the one or more conditions may comprise information verifying that the first security assessment is based on analysis of the first information and/or that the first information is associated with a security context of the computing device.

In some examples, method 400 also comprises step S407: responsive to a determination, by the security determination module and based on the second security assessment, that the first countermeasure module is not operating effectively, determining not to permit the request to utilise the secure user interface and thereby preventing access by the user application to the secure user interface. In other words, in this example, if the first countermeasure module 210 is determined not to be operating effectively, the request from the user application to access the secure user interface is not permitted irrespective of what the first security assessment indicates. This essentially rejects any secure user interface requests when the first countermeasure module 210 cannot be shown to be operating effectively, thereby providing increased security.

It will be appreciated that steps of method 400 may be performed in an order different to that shown in FIG. 4. For example, although step S404 is shown after step S403 in FIG. 4, in some examples S404 may be performed before S403, and in some examples, before S401 and/or S402.

Figure 5:
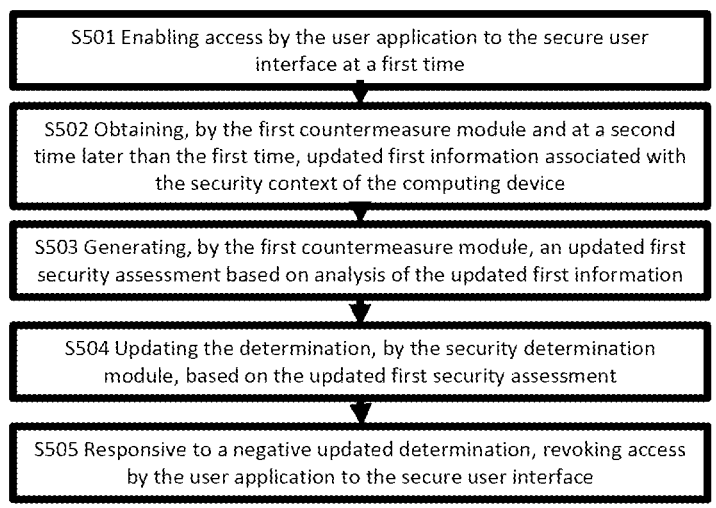
FIG. 5: Schematically illustrates a method for revoking access to a secure user interface on a computing device according to teachings of the present disclosure.

FIG. 5 schematically illustrates a method 500 for revoking access to a secure user interface on a computing device according to teachings of the present disclosure. It will be understood that method 500 can be implemented on the computing device 100 depicted in FIG. 1 or the computing device 200 depicted in FIG. 2. The method 500 includes the following steps.

At step S501, access is enabled by the user application to the secure user interface at a first time.

At step S502, updated first information associated with a security context of the computing device is obtained by the first countermeasure module at a second time later than the first time.

At step S503, an updated first security assessment is generated by the first countermeasure module based on analysis of the updated first information.

At step S504, the determination is updated by the security determination module, based on the updated first security assessment.

At step S505, responsive to a negative updated determination, access by the user application to the secure user interface is revoked.

It will be appreciated that step S501 may include the steps of method 300 or method 400 that results in access by the user application to the secure user interface being enabled.

In other words, in the current example, if updated information is obtained after access by the user application to a secure user interface has already been enabled, i.e. after the method of FIG. 3 or FIG. 4 has been performed, access may be revoked based on the updated information. This ensures the security of the secure user interface and prevents a secure user interface from being compromised by a side-channel attack even after the secure user interface has started running. For example, the updated first information may indicate that a malicious actor is attempting to perform a side-channel attack. This may be indicated by the first information indicating that a sensor input, output or software process has started after the first time, as described above.

Thus, method 500 addresses a situation where access is enabled, but at a later time the first countermeasure module obtains updated information that indicates a malicious actor is performing a side-channel attack, for example, using a sensor of the computing device. In this situation, access to utilise the secure user interface is revoked such that a user of the computing device cannot input sensitive information.

In some examples, the second time is a time at which the first countermeasure module receives an indication of a change in the security context of the computing device. This allows for efficient detection and revocation of secure user interface access in the event of a side-channel attack. For example, the first countermeasure module may receive a notification from an API. In some examples, the first countermeasure module may receive an indication of a change in the security context of the computing device as part of a schedule or in response to a triggering event. In some examples, a triggering invent may be that an activity of a sensor of the computing device has changed or a status of a sensor has changed.

In some examples, the updated first information relates to a sensor input to the computing device, an output from the computing device, or a software process running on the computing device that started after the first time. Thereby, side-channel attacks may be efficiently identified. In other words, the updated first information thus indicates that a malicious actor is attempting to perform a side-channel attack.

Figure 6:
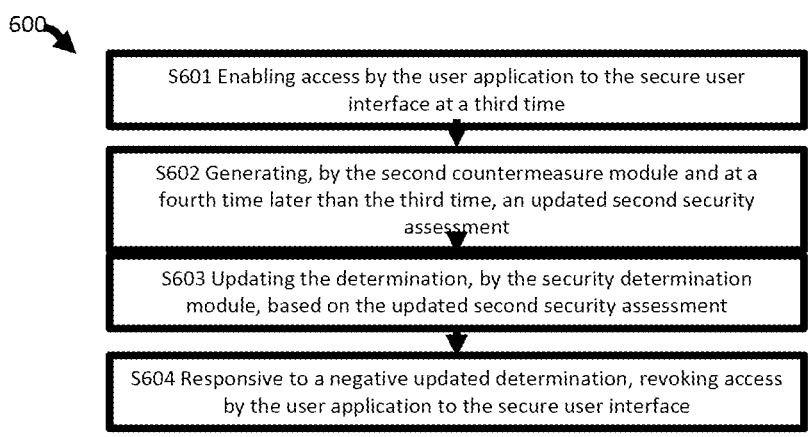
FIG. 6: Schematically illustrates a method for revoking access to a secure user interface on a computing device according to further teachings of the present disclosure.

FIG. 6 schematically illustrates a method 600 for revoking access to a secure user interface on a computing device according to further teachings of the present disclosure. It will be understood that method 600 can be implemented on the computing device 200 depicted in FIG. 2. The method 600 includes the following steps.

At step S601, access is enabled by the user application to the secure user interface at a third time.

At step S602, an updated second security assessment is generated by the second countermeasure module at a fourth time later than the third time.

At step S603, the determination is updated by the security determination module, based on the updated second security assessment.

At step S604, responsive to a negative updated determination, access by the user application to the secure user interface is revoked.

It will be appreciated that step S601 may include the steps of method 400 that results in access by the user application to the secure user interface being enabled. Additionally, step S602 may be based on verifying effective operation of the first countermeasure module at the fourth time. It will be further appreciated that method 600 may be performed before or after, or otherwise in conjunction with any of method 500 depicted in FIG. 5 and method 700 depicted in FIG. 7. Indeed, any of methods 400, 500, 600, 700 may be performed in conjunction with each other.

In other words, in the current example, the second security assessment is updated by the second countermeasure module, and if the second countermeasure module determines that the first countermeasure module is no longer operating effectively, i.e. the one or more conditions are no longer satisfied at the fourth time, access by the user application to the secure user interface is revoked. Thus, the second countermeasure monitors the operation of the first countermeasure module to ensure that it is operating effectively even after the secure user interface access has been granted. Then, if at any point the first countermeasure module is no longer operating effectively, for example if the one or more conditions are no longer satisfied, then the second countermeasure module generates an updated second security assessment indicating this, and access is revoked. Thereby, side-channel attacks are more effectively prevented and security is increased. In some examples, the second countermeasure module may continually or periodically verify whether the first countermeasure module is operating effectively, for example by assessing whether the one or more conditions for the first countermeasure module are satisfied. In some examples, the second countermeasure module may receive an indication that the one or more conditions are no longer satisfied or that information relating to the one or more conditions has changed, whereupon the second countermeasure module may generate an updated second security assessment.

Thus, method 600 addresses a situation where access is enabled, but at a later time, the second countermeasure module detects that the first countermeasure module is no longer operating effectively or is no longer able to operate effectively and therefore cannot perform its functionality of obtaining first information or updated first information. In this situation, access to utilise the secure user interface is revoked such that a user of the computing device cannot input sensitive information.

Figure 7:
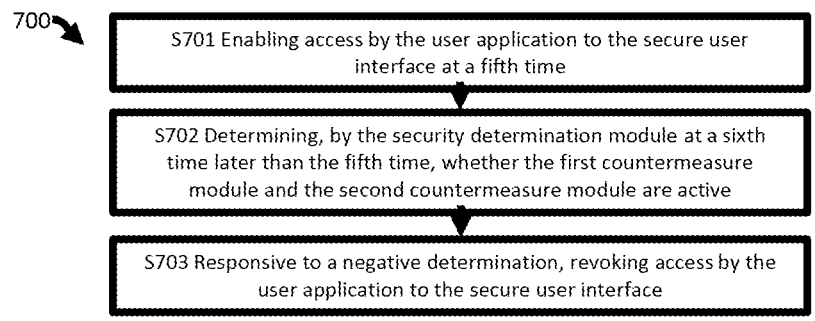
FIG. 7: Schematically illustrates a method for revoking access to a secure user interface on a computing device according to further teachings of the present disclosure.

FIG. 7 schematically illustrates a method 700 for revoking access to a secure user interface on a computing device according to further teachings of the present disclosure. It will be understood that method 600 can be implemented on the computing device 200 depicted in FIG. 2. The method 700 includes the following steps. It will further be understood that step S701 of method 700 may occur at any point when access has been enabled, for example following method 400. It will further be understood that if access is revoked, for example following method 500, 600 or 700, access may be enabled again, for example, following method 400, if the method 400 determines that access may be enabled.

At step S701, access is enabled by the user application to the secure user interface at a fifth time.

At step S702, it is determined, by the security determination module at a sixth time later than the fifth time, whether the first countermeasure module and the second countermeasure module are active.

At step S703, responsive to a negative determination, access by the user application to the secure user interface is revoked.

In other words, once access has been enabled, the security determination module repeatedly checks whether the first and second countermeasure modules are active. Thus, security is increased as the likelihood of one or both of the countermeasure modules being offline, inactive, or compromised is reduced. In some examples, this is determined through the sending and receiving of messages or packets. This process may be repeated based on a timer using a predefined time count, or a random period of time within a time range. In some examples, this process is triggered based on specific triggers or interrupts within an operating system of the computing device. For example, waking back up from a sleep or period of inactivity, or a sensor or API being accessed.

In some examples described herein, responsive to determining that a predefined time has elapsed from a time when access by the user to the secure user interface was enabled, one or both of the first countermeasure modules 210 are caused to re-obtain information and re-generate the first security assessment, and the second countermeasure module 250 to re-generate the second security assessment. Thus, the countermeasure modules may repeat their functionality to ensure that the security assessments are up to date and to prevent a malicious actor circumventing the protections. This The first and second countermeasure modules may be caused by the security determination module, or they may be caused by determining themselves that the predefined time has elapsed. The predefined time may be a random time within a predefined time window.

In some examples described herein, access by the user application to the secure user interface is controlled by a secure user interface controller. The secure user interface controller may be responsible for enabling or revoking access. In some examples, access by the user application to the secure user interface is controlled by a secure user interface controller implemented by a Trusted Application running in a Trusted Execution Environment. In such examples, the integrity of the secure user interface controller can be assured such that vulnerability to side-channel attacks is decreased. In some examples, the Trusted Execution Environment may be provided by Arm TrustZone, AMD PSP or Intel SGX.

In some examples described herein, the first countermeasure module implements a white list for sensor inputs, outputs, and/or software processes that do not cause the security determination module to prevent or revoke access by the user application to the secure user interface. As such, the first countermeasure module is able to discern between malicious activity and non-malicious activity and implement a more granular security policy approach. For example, if a secure user interface requires access to the camera, in such examples, the first countermeasure module acts to differentiate such non-malicious camera use from use by a malicious user. In some examples, the white list may be based on the user application requesting to utilise a secure user interface.

Figure 8:
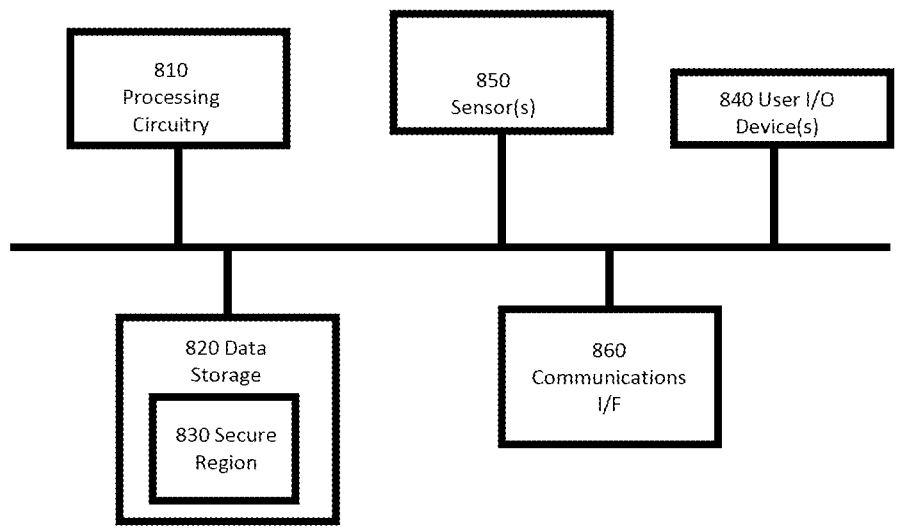
FIG. 8: Schematically illustrates an electronic device that may be configured to operate as the computing device according to teachings of the present disclosure.

FIG. 8 schematically illustrates an example of an electronic device 800 which can be used to implement the computing device 100 as depicted in FIG. 1 or the computing device 200 as depicted in FIG. 2 as well as any of the teachings discussed in FIGS. 3 to 7. The device has processing circuitry 810 for performing data processing in response to program instructions, data storage 820 for storing data and instructions to be processed by the processing circuitry 810. In some examples, the processing circuitry 810 can correspond to processing circuitry which is operable to implement a Trusted Execution Environment (TEE) and a Rich Execution Environment (REE). The Trusted Execution Environment (TEE) acts as a secure area of a processor in which to execute sensitive applications and processes.

The TEE is isolated from a Rich Execution Environment (REE) in which a rich-OS can be executed. In some examples, the processing circuitry 810 includes one or more caches for caching recent data or instructions. The data storage 820 may have a secure region 830 which is protected by hardware mechanisms (e.g. using memory protection units or security mechanisms providing a TEE) or by software mechanisms (e.g. encryption), so that data stored in a secure region 830 is inaccessible to software not executing within a trusted environment. The device 800 may have a communications interface 860 for communicating with external devices. For example communications interface 560 could use any other range of different communication protocols, such as cellular, Ethernet, WiFi®, Bluetooth®, ZigBee®, etc. The device may have one or more sensors 850 for sensing certain external conditions such as temperature, pressure, the proximity of a nearby user, etc. The specific sensors 850 provided may depend on the purpose of the device. For example sensors 850 may include sensors which aid in biometric authentication such as a fingerprint sensor and a face recognition camera system. Sensors 850 may include a camera, a microphone, an orientation sensor, a light sensor, or a position sensor. It will be appreciated that FIG. 8 is merely an example of possible hardware that may be provided in the device and other components may also be provided. For example, some devices for which user interaction is expected may be provided with one or more user input/output device(s) 840 to receive input from a user or to output information to a user.

The methods discussed above may be performed under control of a computer program executing on a computing device. Hence a computer program may comprise instructions for controlling a computing device to perform any of the methods discussed above. The program can be stored on a computer-readable medium. A computer readable medium may include non-transitory type media such as physical storage media including storage discs and solid state devices. A computer readable medium may additionally or alternatively include transient media such as carrier signals and transmission media. A computer-readable storage medium is defined herein as a non-transitory memory device. A memory device includes memory space within a single physical storage device or memory space spread across multiple physical storage devices.

The invention claimed is:

1. A method for providing a secure user interface on a computing device comprising:
   receiving, from a user application, a request to utilise a secure user interface on the computing device;
   obtaining, by a first countermeasure module, first information associated with a security context of the computing device;
   generating, by the first countermeasure module, a first security assessment based on analysis of the first information;
   generating, by a second countermeasure module, a second security assessment based on verifying effective operation of the first countermeasure module;
   determining, by a security determination module, whether to permit the request to utilise the secure user interface based on the first security assessment and the second security assessment; and
   responsive to a positive determination, enabling access by the user application to the secure user interface.

2. The method of claim 1, wherein generating, by the second countermeasure module, the second security assessment based on verifying effective operation of the first countermeasure module further comprises:
   assessing, by the second countermeasure module, whether one or more conditions for the first countermeasure module are satisfied.

3. The method of claim 2, wherein the one or more conditions relate to one or more of: a user granted access permission, and an API property.

4. The method of claim 1, further comprising:
   responsive to a determination, by the security determination module and based on the second security assessment, that the first countermeasure module is not operating effectively, determining not to permit the request to utilise the secure user interface and thereby preventing access by the user application to the secure user interface.

5. The method of claim 1, wherein the first information comprises information based on one or more of: a sensor input to the computing device, an output from the computing device, and a software process running on the computing device.

6. The method of claim 1, wherein the first information comprises information based on a status of one or more of: a sensor of the computing device, a microphone of the computing device, a position sensor of the computing device, an orientation sensor of the computing device, an accelerometer of the computing device, a camera of the computing device, and a service recording a display of the computing device.

7. The method of claim 1, wherein access by the user application to the secure user interface is enabled at a first time, the method further comprising:
   obtaining, by the first countermeasure module and at a second time later than the first time, updated first information associated with the security context of the computing device;
   generating, by the first countermeasure module, an updated first security assessment based on analysis of the updated first information;
   updating the determination, by the security determination module, based on the updated first security assessment; and
   responsive to a negative updated determination, revoking access by the user application to the secure user interface.

8. The method of claim 7, wherein the second time is a time at which the first countermeasure module receives an indication of a change in the security context of the computing device.

9. The method of claim 7, wherein the updated first information relates to a sensor input to the computing device, an output from the computing device, or a software process running on the computing device that started after the first time.

10. The method of claim 1, wherein access by the user application to the secure user interface is enabled at a third time, the method further comprising:
    generating, by the second countermeasure module and at a fourth time later than the third time, an updated second security assessment;
    updating the determination, by the security determination module, based on the updated second security assessment; and
    responsive to a negative updated determination, revoking access by the user application to the secure user interface.

11. The method of claim 1, wherein access by the user application to the secure user interface is enabled at a fifth time, the method further comprising:
- determining, by the security determination module at a sixth time later than the fifth time, whether the first countermeasure module and the second countermeasure module are active; and
- responsive to a negative determination, revoking access by the user application to the secure user interface.

12. The method of claim 1, further comprising:
- responsive to determining that a predefined time has elapsed from a time when access by a user to the secure user interface was enabled, causing one or both of the first countermeasure module to re-obtain information and re-generate the first security assessment, and the second countermeasure module to re-generate the second security assessment.

13. The method of claim 1, wherein access by the user application to the secure user interface is controlled by a secure user interface controller implemented by a Trusted Application running in a Trusted Execution Environment.

14. The method of claim 1, wherein the first countermeasure module implements a white list for sensor inputs, outputs, and/or software processes that do not cause the security determination module to prevent or revoke access by the user application to the secure user interface.

15. A storage medium storing a computer program for controlling an electronic device to perform the method of claim 1.

16. An computing device for providing a secure user interface comprising:
- processing circuitry to perform data processing; and
- data storage storing at least one computer program for controlling the processing circuitry to perform the method of claim 1.

* * * * *